(12) United States Patent
Lee et al.

(10) Patent No.: US 9,547,389 B2
(45) Date of Patent: Jan. 17, 2017

(54) POSITION DETECTING SYSTEM AND DRIVING METHOD THEREOF

(71) Applicant: Samsung Display Co., Ltd., Yongin, Gyeonggi-Do (KR)

(72) Inventors: Il Ho Lee, Pyeongtaek-si (KR); Seung Ho Nam, Seongnam-si (KR); Hyun-Ju Lee, Seoul (KR)

(73) Assignee: Samsung Display Co., Ltd. (KR)

( * ) Notice: Subject to any disclaimer, the term of this patent is extended or adjusted under 35 U.S.C. 154(b) by 98 days.

(21) Appl. No.: 14/055,728

(22) Filed: Oct. 16, 2013

(65) Prior Publication Data

US 2015/0009169 A1 Jan. 8, 2015

(30) Foreign Application Priority Data

Jul. 2, 2013 (KR) .................. 10-2013-0077233

(51) Int. Cl.
| | |
|---|---|
| *G06F 3/041* | (2006.01) |
| *G06F 3/042* | (2006.01) |
| *G06F 3/03* | (2006.01) |
| *G02F 1/1333* | (2006.01) |

(52) U.S. Cl.
CPC ........... *G06F 3/0416* (2013.01); *G06F 3/0304* (2013.01); *G06F 3/0412* (2013.01); *G06F 3/0421* (2013.01); *G02F 1/13338* (2013.01)

(58) Field of Classification Search
CPC .... G06F 3/0416; G06F 3/0412; G06F 3/0304; G02F 1/13338
USPC ......................................................... 345/175
See application file for complete search history.

(56) References Cited

U.S. PATENT DOCUMENTS

| | | | |
|---|---|---|---|
| 4,878,553 A | 11/1989 | Yamanami et al. | |
| 7,180,509 B2 * | 2/2007 | Fermgard et al. | ............ 345/179 |
| 7,385,594 B2 | 6/2008 | Liao et al. | |
| 7,408,536 B2 | 8/2008 | Hugosson et al. | |
| 8,102,378 B2 | 1/2012 | Chung et al. | |
| 2003/0016024 A1 * | 1/2003 | Teranuma et al. | ............ 324/519 |
| 2005/0120295 A1 * | 6/2005 | Sako et al. | ................... 715/507 |
| 2005/0203621 A1 * | 9/2005 | Steiner et al. | ............ 623/13.14 |
| 2005/0237313 A1 | 10/2005 | Yoshida | |
| 2006/0022963 A1 * | 2/2006 | Bosch et al. | .................. 345/179 |
| 2008/0252606 A1 | 10/2008 | Gillies et al. | |

(Continued)

FOREIGN PATENT DOCUMENTS

| | | |
|---|---|---|
| JP | 2010-026693 A | 2/2010 |
| JP | 5025551 | 6/2012 |

(Continued)

*Primary Examiner* — Jonathan Boyd
(74) *Attorney, Agent, or Firm* — Innovation Counsel LLP

(57) ABSTRACT

The present disclosure relates to a position detecting system. The position detecting system includes a display panel including a plurality of pixels. The position detecting system also includes a data driving unit configured to apply a first data voltage and a second data voltage to the display panel, wherein the first data voltage is associated with display of an image on the display panel during a first frame and the second data voltage is associated with display of patterns on the display panel during a second frame. The position detecting system further includes a position detecting sensor configured to capture an image of the patterns when a position detecting mode of the position detecting sensor is turned on.

20 Claims, 13 Drawing Sheets

(56) References Cited

U.S. PATENT DOCUMENTS

| | | | |
|---|---|---|---|
| 2011/0267313 A1* | 11/2011 | Ko | G06F 3/0428 345/175 |
| 2012/0154336 A1 | 6/2012 | Lee et al. | |
| 2012/0249490 A1 | 10/2012 | Lee et al. | |
| 2013/0009912 A1 | 1/2013 | Han et al. | |

FOREIGN PATENT DOCUMENTS

| | | |
|---|---|---|
| JP | 2012-164139 A | 8/2012 |
| JP | 2012-243201 A | 12/2012 |
| KR | 10-0939136 | 1/2010 |

* cited by examiner

POSITION DETECTING SYSTEM AND DRIVING METHOD THEREOF

CROSS-REFERENCE TO RELATED APPLICATION

This application claims priority to and the benefit of Korean Patent Application No. 10-2013-0077233 filed in the Korean Intellectual Property Office on Jul. 2, 2013, the entire contents of which are incorporated herein by reference.

BACKGROUND (a) Technical Field

The present disclosure relates to a position detecting system and a driving method thereof, and more particularly, to a position detecting system including a display capable of detecting a position on a display panel and a driving method thereof.

(b) Description of the Related Art

A display device (such as liquid crystal display (LCD), organic light emitting diode display (OLED display), or electrophoretic display) typically includes a field generating electrode and an electro-optical active layer. An LCD may include a liquid crystal layer as the electro-optical active layer; an OLED display may include an organic light emitting layer as the electro-optical active layer; and an electrophoretic display may include a layer having charge-carrying particles as the electro-optical active layer. The field generating electrode may receive a data signal by being connected to a switching element (e.g. a thin film transistor). When a data signal is applied to the switching element, the electro-optical active layer displays an image by converting the data signal into an optical signal.

In addition to the image display function, a display device may include a touch detecting function. The touch detecting function allows a user to interact with the display device when contact information is received (or detected) from the user. For example, a display device having a touch detecting function can detect whether an object has approached or made physical contact with the screen of the display device, as well as the actual contact position on the screen (if contact has been made). The touch detecting function may be accomplished using, for example, a touch sensor to detect a change in pressure, charge, or reflected light in the display device when a user approaches or touches the screen with a finger or touch pen. The detected information is then converted into an image signal for displaying an image on the display device.

The touch sensor may include resistive sensors, capacitive sensors, electro-magnetic type (EM) sensors, optical sensors, or other types of sensors.

A capacitive touch sensor may include a sensing capacitor having a sensing electrode capable of transferring a sensing signal. Specifically, the capacitive touch sensor can detect whether contact has been made and the actual contact position, by sensing the change in capacitance of the sensing capacitor when a conductive element (such as the user's finger) approaches the sensor.

In a resistive touch sensor, a pair of electrodes spaced apart may come into contact due to external pressure from an object. When the two electrodes make contact at a particular position, the resistance of the electrodes changes. The contact position is then determined by measuring the corresponding change in voltage.

The resistive touch sensor typically works well for a single point of contact. However, if a user simultaneously touches a plurality of points on the screen of the display device, the resistive touch sensor may not be able to obtain touch information pertaining to the plurality of points since the voltages registered across the points are the same. A capacitive type touch sensor may be capable of obtaining information pertaining to a plurality of points. However, the capacitive type touch sensor may not be able to obtain contact information if an insulator makes contact with the screen (e.g. when a user is wearing hand-gloves).

It is noted that various technologies of obtaining contact information relating to contact positions on the display panel have been developed. For example, a touch pen may be used to contact the display panel, capture an image of patterns formed on the display panel, and determine contact information based on the captured image of the patterns. However, the conventional method for detecting contact positions on a display panel may require forming patterns permanently on the display panel, which may increase manufacturing costs as well as the size and/or thickness of the display panel. Furthermore, the patterns for detecting contact positions may overlap with other image frames, which may subsequently reduce image quality.

In some cases, it may be useful if the display devices can sense contact strength in addition to contact position. Contact strength refers to the amount of pressure that a user applies on a particular spot on the screen of the display device. However, conventional display devices including the above touch sensors may lack the capability of sensing both contact position and contact strength.

SUMMARY

The present disclosure is directed to address the above deficiencies in conventional display devices including the existing touch sensors.

According to some embodiments of the inventive concept, a position detecting system is provided. The position detecting system includes a display panel including a plurality of pixels; a data driving unit configured to apply a first data voltage and a second data voltage to the display panel, wherein the first data voltage is associated with display of an image on the display panel during a first frame and the second data voltage is associated with display of patterns on the display panel during a second frame; and a position detecting sensor configured to capture an image of the patterns when a position detecting mode of the position detecting sensor is turned on.

In some embodiments, the position detecting system may further include a backlight unit including a visible light emitting unit configured to supply visible light to the display panel.

In some embodiments, when the position detecting mode is turned off, the data driving unit may be configured to apply the first data voltage to the display panel, and the backlight unit may be configured to supply the visible light to the display panel.

In some embodiments, the backlight unit may be configured to supply the visible light to the display panel during a portion of the second frame when the second data voltage is being applied to the display panel during the second frame.

In some embodiments, the backlight unit may be configured to supply the visible light to the display panel during the first frame when the first data voltage is being applied to the display panel during the first frame.

In some embodiments, the position detecting sensor may include a camera configured to capture a portion of the image of the patterns, wherein a position of the camera within the position detecting sensor may change depending on a contact pressure applied to the position detecting sensor.

In some embodiments, the position detecting sensor may include a light source configured to emit the visible light towards the display panel, and a camera may be configured to capture a portion of the visible light reflected from the display panel, wherein the portion of the reflected light may be used to form the image of the patterns.

In some embodiments, the backlight unit may be turned off during the second frame when the second data voltage is applied to the display panel during the second frame, and the backlight unit may be turned on during the first frame when the first data voltage is applied to the display panel during the first frame.

In some embodiments, the backlight unit may further include an infrared light emitting unit configured to supply infrared light to the display panel.

In some embodiments, the infrared light emitting unit may be configured to emit the infrared light when the second data voltage is applied to the display panel during the second frame, and the visible light emitting unit may be configured to emit the visible light when the first data voltage is applied to the display panel during the first frame.

According to some other embodiments of the inventive concept, a method of driving a position detecting system is provided. The method includes applying a first data voltage and a second data voltage to a display panel, wherein the first data voltage is associated with display of an image on the display panel during a first frame and the second data voltage is associated with display of patterns on the display panel during a second frame; displaying an image of the patterns on the display panel based on the second data voltage; and capturing an image of the patterns using a position detecting sensor when a position detecting mode of the position detecting sensor is turned on.

In some embodiments, when the position detecting mode is turned off, the method may further include applying the first data voltage to the display panel, and supplying visible light to the display panel.

In some embodiments, the method may further include supplying visible light to the display panel during a portion of the second frame when the second data voltage is being applied to the display panel during the second frame.

In some embodiments of the method, capturing the image of the patterns using the position detecting sensor may further include emitting light towards the display panel, and capturing a portion of the light reflected from the display panel, wherein the portion of the reflected light may be used to form the image of the patterns.

In some embodiments, the method may further include supplying infrared light to the display panel when the second data voltage is applied to the display panel, and supplying visible light to the display panel when the first data voltage is applied to the display panel.

In some embodiments, the method may further include changing a position of a camera disposed within the position detecting sensor based on a contact pressure applied to the position detecting sensor.

In some embodiments, the method may further include generating touch information by processing the image of the patterns captured by the position detecting sensor.

DETAILED DESCRIPTION

The present inventive concept will be described more fully herein with reference to the accompanying drawings, in which exemplary embodiments of the inventive concept are shown. As those skilled in the art would realize, the embodiments may be modified in various ways without departing from the spirit or scope of the inventive concept.

Figure 1:
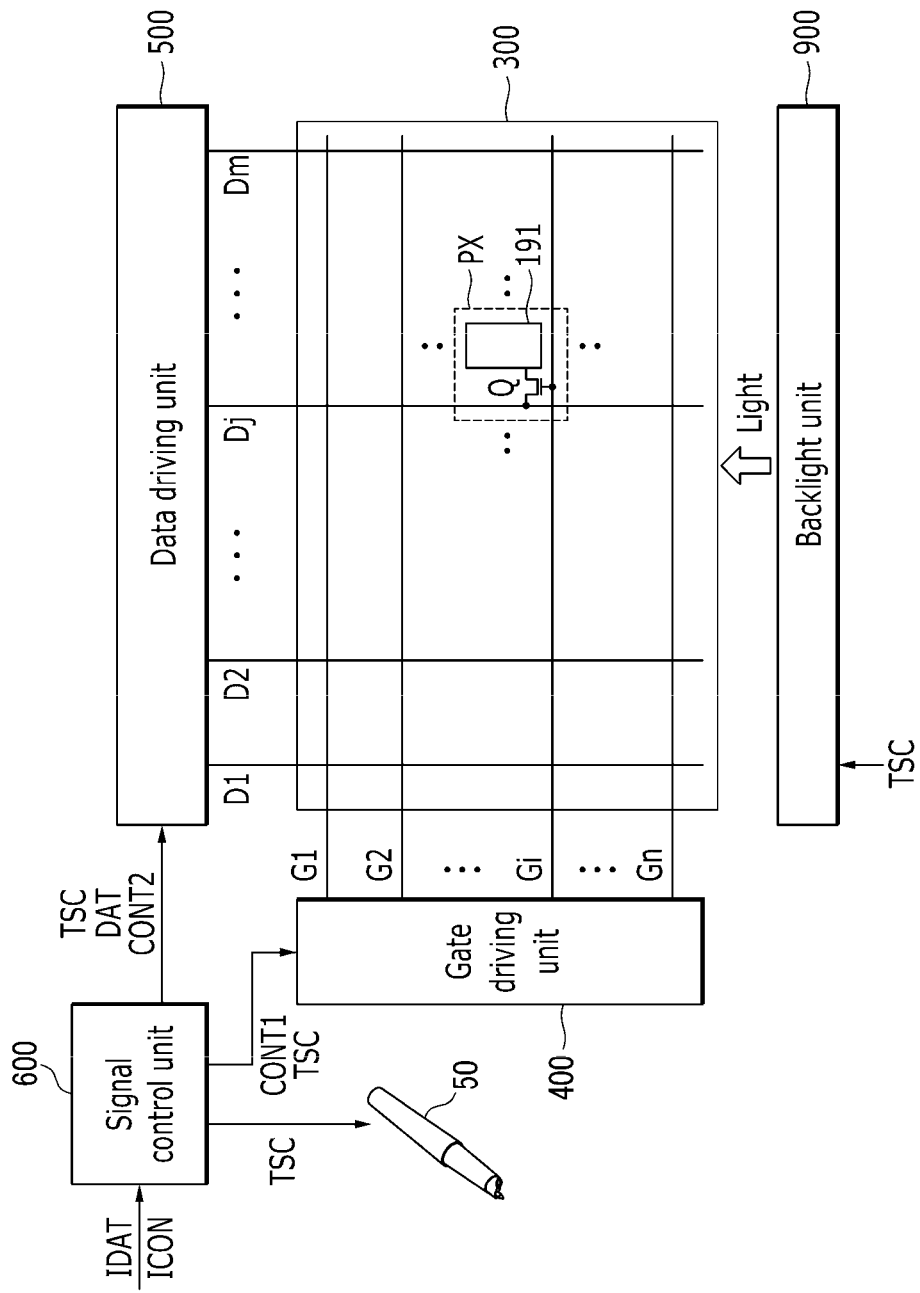
FIG. 1 is a block diagram of a position detecting system according to an embodiment of the inventive concept.

FIG. 1 is a block diagram of a position detecting system according to an embodiment.

Referring to FIG. 1, the position detecting system includes a display unit and a position detecting sensor 50.

The display unit includes a display panel 300, a gate driving unit 400, a data driving unit 500, and a signal control unit 600. The gate driving unit 400 and the data driving unit 500 are connected to the display panel 300. The signal control unit 600 is configured to control the display panel 300, gate driving unit 400, data driving unit 500, and position detecting sensor 50.

The display panel 300 includes a plurality of signal lines and a plurality of pixels PXs connected to signal lines. The signal lines include a plurality of gate lines (G1 to Gn) for transferring gate signals (also commonly referred to as "scanning signals") and a plurality of data lines (D1 to Dm) for transferring data voltages.

The pixels PXs may be arranged in a matrix form. Each pixel PX may include a switching element Q connected to a data line, gate line, and a pixel electrode 191. The switching element Q may include a thin film transistor. The switching element Q may be controlled using a gate signal, so as to transfer a data voltage to the pixel electrode 191 (of the corresponding pixel PX).

Figure 2:
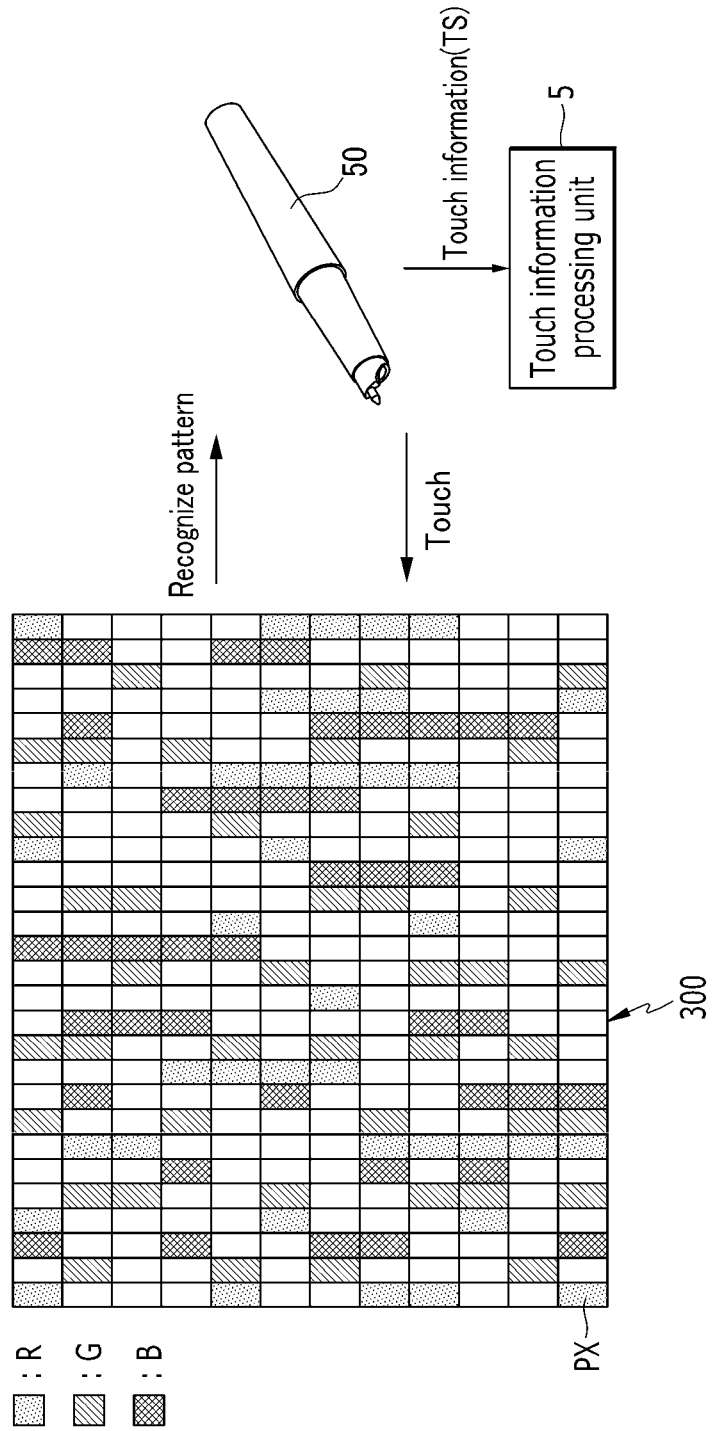
FIG. 2 depicts the interaction between the position detecting sensor and the display panel shown in FIG. 1.

The pixels PX can display full color images via spatial division or temporal division. In spatial division, each pixel PX may display one of the primary colors in a spatial arrangement. In temporal division, the pixels PX may alternately display the primary colors over a period of time. A desired color is produced based on a spatial sum or a temporal sum of the displayed primary colors. Examples of primary colors include the three primary colors (red (R), green (G), and blue (B)), as illustrated in FIG. 2. In other embodiments (not shown), the primary colors may include colors such as yellow, cyan, and magenta.

The data driving unit 500 is connected to the data lines D1 to Dm. The data driving unit 500 selects a gray voltage based on an output image signal DAT received from the signal control unit 600. The data driving unit 500 then applies the selected gray voltage (as the data voltage) to the data lines D1 to Dm. In some embodiments, the data driving unit 500 may receive gray voltages from a separate gray voltage generation unit, or divide reference gray voltages for a portion of the overall grays to generate gray voltages for the overall grays and select a data voltage among the gray voltages.

The gate driving unit 400 is connected to the gate lines G1 to Gn. The gate driving unit 400 applies the gate signals (which include a gate-on voltage Von and a gate-off voltage Voff) to the gate lines G1 to Gn.

The signal control unit 600 receives an input image signal IDAT and an input control signal ICON from an external source (e.g. an external graphic control unit) (not illustrated).

The input image signal IDAT includes luminance information on each pixel PX, wherein the luminance information includes a defined number of grays. An input image signal IDAT may be used to generate each primary color represented by a pixel PX. For example, when a pixel PX represents one of the primary colors red, green, and blue, the input image signal IDAT may include the corresponding red image signal, green image signal, or blue image signal.

The input control signal ICON may include a vertical synchronization signal, a horizontal synchronization signal, a main clock signal, or a data enable signal.

The signal control unit 600 processes the input image signal IDAT based on the input control signal ICON, and converts the input image signal IDAT into the output image signal DAT. As shown in FIG. 1, the signal control unit 600 also generates a gate control signal CONT1, a data control signal CONT2, and one or more detection control signals TSC.

The output image signal DAT may include a first output image signal DAT-1 (for displaying an image to an observer) and a second output image signal DAT-2 (for displaying patterns that are used to detect contact positions on the display panel). Accordingly, the signal control unit 600 may process the input image signal IDAT, so as to generate the output image signal DAT comprising the first output image signal DAT-1 (for image display) and the second output image signal DAT-2 (for patterns display). However, in some particular embodiments, the second output image signal IDAT-2 may be omitted. Thus, in those particular embodiments, the signal control unit 600 may exclusively generate the output image signal DAT-1 (for image display). It is noted that in some further embodiments, the signal control unit 600 may store in advance information relating to the second output image signal DAT-2.

The first output image signal DAT-1 and the second output image signal DAT-2 may be alternately output from the signal control unit 600 to the data driving unit 500 at different times. For example, the signal control unit 600 may output the first output image signal DAT-1 to the data driving unit 500 during a first time period, and output the second output image signal DAT-2 to the data driving unit 500 during a second time period. In some embodiments, the data driving unit 500 may store in advance information relating to the second output image signal DAT-2.

The data control signal CONT2 may further include an inversion signal that inverts a polarity of the data voltage for a common voltage Vcom.

The detection control signal TSC controls the display unit and the position detecting sensor 50, so as to allow contact positions on the display panel 300 to be detected.

As shown in FIG. 1, the display unit may further include a backlight unit 900 for supplying light to the display panel 300. The backlight unit 900 may include a light emitting unit (not illustrated) that emits visible light. In some embodiments, the backlight unit 900 may further include a separate light emitting unit (not illustrated) that emits invisible light in other wavelength bands (such as infrared light).

The backlight unit 900 may be configured to receive the detection control signal TSC from the signal control unit 600.

As mentioned previously, the position detecting system includes the position detecting sensor 50. The position detecting sensor 50 is configured to capture an image of a region of the display panel 300. The detecting sensor 50 is also capable of detecting contact positions or contact coordinates on the display panel 300. Contact may be established when a user comes into direct physical contact with the display panel 300 or approaches within a predetermined proximity to the display panel 300. The position detecting sensor 50 may be provided in the form of a pen (such as a touch pen), that allows the user to enter an input on the display panel 300. Nevertheless, it should be noted that the position detecting sensor 50 need not be limited to a touch pen, and may include other forms of peripherals/accessories that allow a user to interact with the display unit.

The position detecting sensor 50 may be configured to receive the detection control signal TSC from the signal control unit 600. As mentioned above, the position detecting sensor 50 is capable of capturing an image of a region on the display panel 300.

Figure 3:
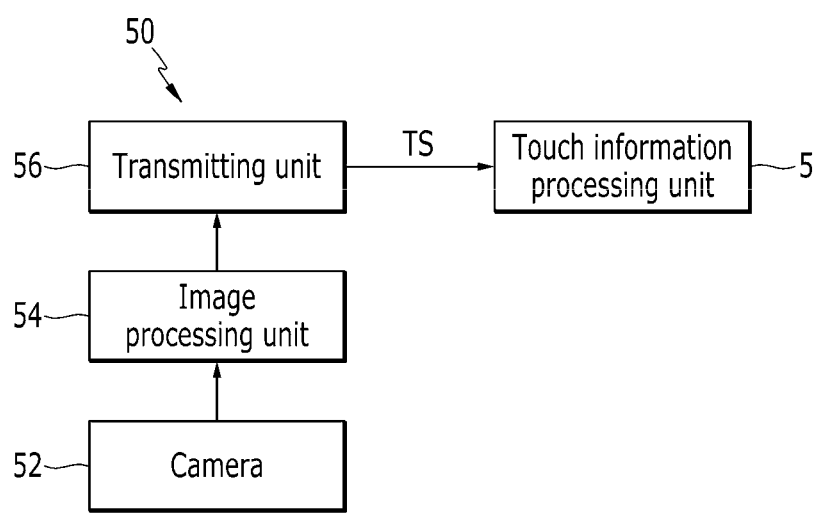
FIG. 3 is a block diagram of the position detecting sensor of FIG. 1.

FIG. 3 is a block diagram of the position detecting sensor 50 of FIG. 1. Referring to FIG. 3, the position detecting sensor 50 may include a camera 52, an image processing unit 54, and a transmitting unit 56.

The camera 52 may capture an image of a region on the display panel 300. The captured image may include patterns (that are used for detecting contact positions) generated by the second output image signal DAT-2.

The image processing unit 54 may process the captured image patterns and generate touch information TS based on the captured image patterns. The touch information TS may include information relating to the coordinates of the contact position or the contact pressure.

As shown in FIG. 3, the transmitting unit 56 may transmit the touch information TS to the touch information processing unit 5. The transmitting unit 56 may also transmit information relating to the time of contact (i.e. when contact was made), as well as identification information of the position detecting sensor 50, to the touch information processing unit 5. The touch information processing unit 5 may be disposed inside or outside of the position detecting sensor 50. The touch information processing unit 5 may process the touch information TS, generate contact information based on the touch information TS, and transmit the contact information to one or more external apparatuses.

Next, an exemplary method of driving the position detecting system of FIG. 1 will be described.

Referring to FIG. 1, the signal control unit 600 receives the input image signal IDAT and the input control signal ICON from an external source (e.g. a graphic control unit). The signal control unit 600 processes the input image signal IDAT based on the input control signal ICON, and converts the input image signal IDAT into the output image signal DAT. The signal control unit 600 also generates the gate control signal CONT1, data control signal CONT2, and one or more detection control signals TSC. As mentioned previously, the output image signal DAT may include the first output image signal DAT-1 (for image display) and the second output image signal DAT-2 (for patterns display).

The signal control unit 600 transmits the gate control signal CONT1 and the detection control signal TSC to the gate driving unit 400. The signal control unit 600 also transmits the data control signal CONT2, output image signal DAT, and detection control signal TSC to the data driving unit 500. In addition, the signal control unit 600 transmits the detection control signal TSC to the position detecting sensor 50 and the backlight unit 900. As mentioned previously, the signal control unit 600 may alternately output the first output image signal DAT-1 and the second output image signal DAT-2 to the data driving unit 500 at different times.

The data driving unit 500 receives the output image signal DAT for the pixel PX of a row based on the data control signal CONT2. The data driving unit 500 then selects a gray voltage corresponding to each output image signal DAT, converts each output image signal DAT into a data voltage (an analog signal), and applies the data voltages to the corresponding data lines D1 to Dm. The data voltage may include a first data voltage (for displaying an image to an observer) and a second data voltage (for displaying patterns which are used to detect contact positions). The first data voltage may be generated from the first output image signal DAT-1 (for image display), and the second data voltage may be generated from the second output image signal DAT-2 (for patterns display).

In some embodiments, the data driving unit 500 may store the second output image signal DAT-2 in advance. In those embodiments, the data driving unit 500 may generate the second data voltage by selecting a gray voltage corresponding to the second output image signal DAT-2.

The backlight unit 900 is configured to receive the detection control signal TSC, and to supply light for illuminating the display panel 300 based on the detection control signal TSC. The backlight unit 900 may supply visible light to the display panel 300. In some embodiments, the backlight unit 900 may supply invisible light in other wavelength bands (such as infrared light), in addition to supplying visible light.

The gate driving unit 400 applies the gate-on voltage Von to the gate lines G1 to Gn based on the gate control signal CONT1 from the signal control unit 600, so as to turn on the switching element Q connected to each gate line. Next, the data voltage (applied to each of the data lines D1 to Dm) is applied to the corresponding pixel PX via the switching element Q. Accordingly, the data voltage constitutes a pixel voltage that charges the pixel PX. When the data voltage is applied to the pixel PX, the pixel PX may display a luminance corresponding to the data voltage using various optical conversion elements. For example, in a liquid crystal display, a gradient of the liquid crystal molecules in a liquid crystal layer is modulated to control the polarization of light passing through the liquid crystal layer. Accordingly, a luminance corresponding to the gray of the output image signal IDAT may be displayed at each pixel PX.

In this inventive concept, a horizontal period corresponds to a period of a horizontal synchronizing signal Hsync and a data enable signal DE. By repeating the above-described method based on a horizontal period, the gate-on voltage Von is sequentially applied to all the gate lines G1 to Gn, and the data voltage is applied to all the pixels PXs, thereby allowing an image of a frame to be displayed. The frame includes a first frame for displaying an image (by applying the first data voltage) and a second frame for displaying patterns (by applying the second data voltage).

When the display of a previous frame has been completed, the step for displaying a next frame begins. A state of an inversion signal included in the data control signal CONT2 may be controlled, so that the polarity of the data voltage applied to each pixel PX is opposite to the polarity of the data voltage in the previous frame (the aforementioned is referred to as a frame inversion). During frame inversion, the polarity of the data voltage Vd applied to all the pixels PX may be inverted by one or more frame.

FIG. 2 depicts the interaction between the position detecting sensor 50 and the display panel 300 shown in FIG. 1.

Referring to FIG. 2, patterns (that are used to detect contact positions) are displayed on the display panel 300 based on the detection control signal TSC. The patterns may be formed by changing the gray of each pixel PX. When the position detecting sensor 50 comes into contact with the display panel 300, the position detecting sensor 50 captures an image of the patterns, and determines the absolute coordinates of the contact position using the gray information of the pixels PX in the captured image.

It should be noted that the patterns (for detecting contact positions) are not limited to those depicted in FIG. 2, and may be modified by one of ordinary skill in the art. For example, a shape and size of the patterns may be modified accordingly based on the resolution of the display unit and the type of position detecting sensor.

As mentioned previously, the patterns may be displayed using the pixels PX on the display panel 300. As a result, a variety of patterns may be formed using different pixel configurations, without having to increase the size or thickness of the display panel 300. In contrast, the conventional method for detecting contact positions on a display panel may require forming patterns permanently on the display panel, which may increase manufacturing costs as well as the size and/or thickness of the display panel. Furthermore, in an exemplary embodiment of the inventive concept, the patterns for detecting contact positions may be displayed in a frame (exclusively for those patterns) which is not recognized by the observer, and need not be combined with other image frames. Accordingly, an observer may observe an improvement in the quality of the images using the above-described embodiment.

When the display panel 300 displays patterns (for detecting contact positions) and the position detecting sensor 50 comes into contact with the display panel 300, the position detecting sensor 50 captures an image of the patterns in the contact region and generates touch information TS. The image of the patterns may include an image(s) rendered by visible light and/or infrared rays. The touch information TS may include information relating to the coordinates of the contact position or contact pressure.

As described above, the touch information TS is transmitted to the touch information processing unit 5, which then processes the touch information TS so as to generate the contact information.

As mentioned previously, the display panel 300 is also capable of displaying an image to an observer. The image may be based on an external input image signal IDAT.

Next, an exemplary backlight unit of the display unit will be described with reference to FIG. 4.

Figure 4:
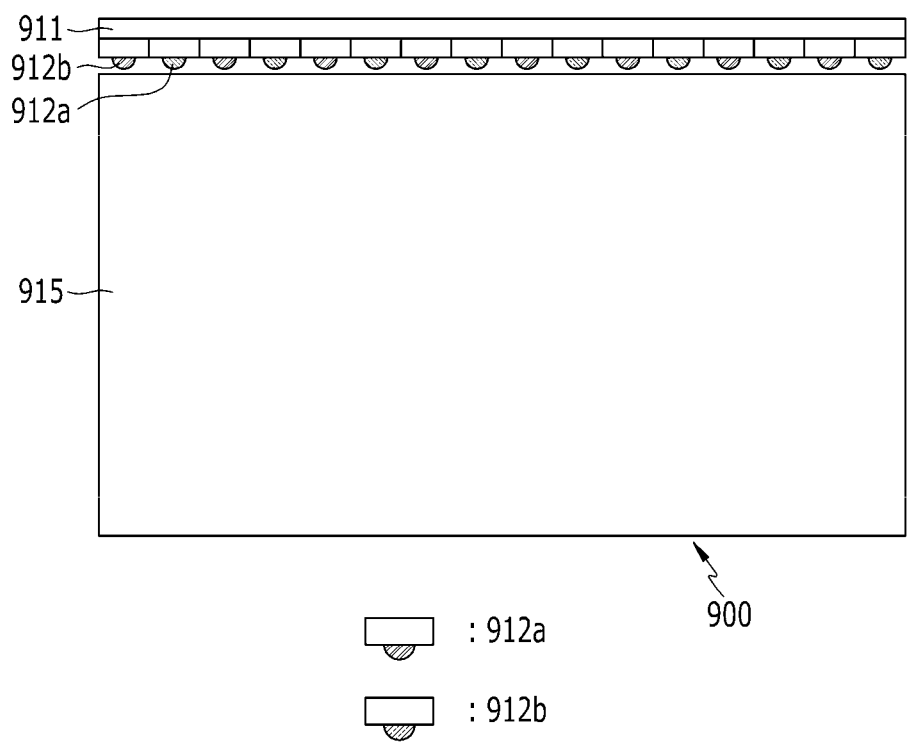
FIG. 4 is a top plan view of the backlight unit of FIG. 1 according to an embodiment.

FIG. 4 is a top plan view of the backlight unit of FIG. 1 according to an embodiment.

Referring to FIG. 4, the backlight unit 900 includes at least two light emitting units capable of emitting light in different wavelength bands. For example, the backlight unit 900 may include a visible light emitting unit 912a capable of emitting visible light, and an infrared light emitting unit 912b capable of emitting invisible light in a different wavelength band (for example, infrared rays).

Each of the visible light emitting unit 912a and the infrared light emitting unit 912b includes a light source. The light source may include at least one light emitting element (such as a light emitting diode (LED) chip). It should be noted that the light emitting element is not limited to an LED chip, and may include other types of light-emitting devices.

In the embodiment of FIG. 4, the backlight unit 900 is provided as an edge type backlight unit. In some other embodiments, the backlight unit may be provided as a direct type backlight unit. As shown in FIG. 4, in the case of an edge type backlight unit, the backlight unit 900 may further include a light guiding plate 915. The visible light emitting unit 912a and the infrared light emitting unit 912b are disposed on a printed circuit board (PCB) 911, and the PCB 911 may be disposed on a side of the light guiding plate 915.

The light guiding plate 915 may guide light (emitted from the visible light emitting unit 912a and the infrared light emitting unit 912b) toward a front surface of the display panel 300.

As illustrated in FIG. 4, the visible light emitting unit 912a and the infrared light emitting unit 912b are alternately disposed. Nevertheless, the layout of the visible light emitting unit 912a and infrared light emitting unit 912b is not limited to the above configuration, and may be disposed in different configurations.

Next, an exemplary method of driving the position detecting system of FIG. 1 will be described with reference to FIGS. 4 and 5.

Figure 5:
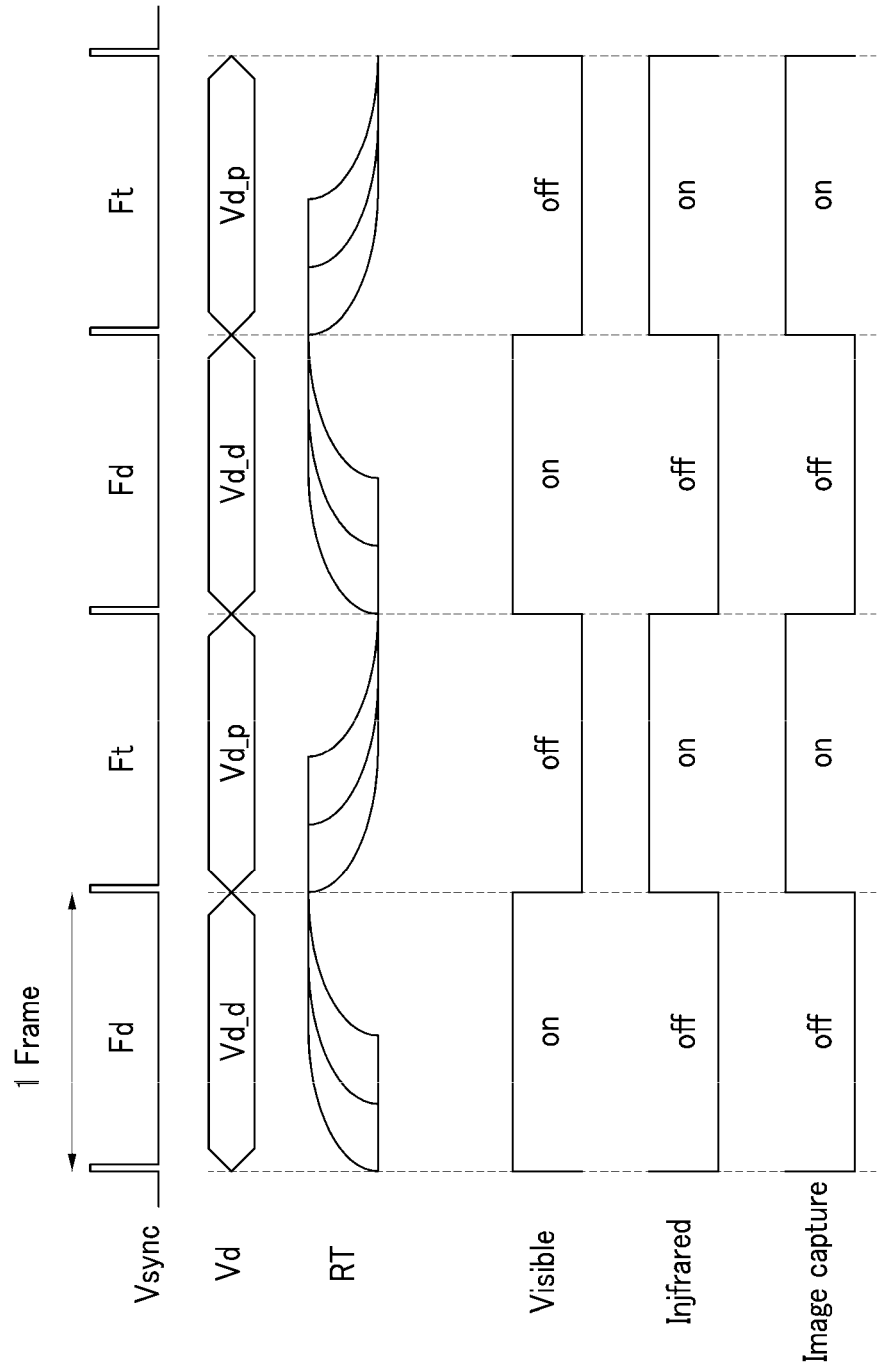
FIG. 5 is a timing diagram of the driving signals in the position detecting system of FIGS. 1 to 4.

FIG. 5 is a timing diagram of the driving signals in the position detecting system of FIGS. 1 to 4.

Referring to FIG. 5, each frame starts in synchronization with a vertical synchronization signal Vsync. The frame includes a frame Fd for displaying an image and a frame Ft for displaying patterns. According to an exemplary embodiment, the frames Fd and Ft may be alternately disposed, as illustrated in FIG. 5.

A first data voltage Vd_d (for displaying an image) is input to the display panel 300 during the frames Fd. A second data voltage Vd_p (for displaying patterns) is input to the display panel 300 during the frames Ft.

For each frame, when a pixel PX of the display panel 300 receives a data voltage (either the first data voltage Vd_d or the second data voltage Vd_p), the optical conversion element of the pixel PX (for example, liquid crystal molecules) responds to the data voltage. A response degree RT of the optical conversion element is rapidly changed at the early stage of each frame, and thus the optical conversion element may reach a target state (for example, a state that the liquid crystal molecules lie in a VA (Vertical Alignment) mode) after some time has lapsed.

When a display unit includes the backlight unit 900 of FIG. 4, the visible light emitting unit 912a of the backlight unit 900 may be turned on during the frames Fd and turned off during the frames Ft. Conversely, the infrared light emitting unit 912b of the backlight unit 900 may be turned off during the frames Fd and turned on during the frames Ft. Accordingly, the images for the frames Fd and the patterns for the frames Ft will not overlap on the display panel 300, thereby resulting in greater image clarity to an observer.

When the position detecting sensor 50 approaches or contacts the display panel 300, the position detecting sensor 50 operates during the frames Ft and captures an image of the patterns. As mentioned previously, the position detecting sensor 50 obtains information relating to the contact positions from the captured image patterns. Accordingly, in the embodiment of FIG. 5, the position detecting sensor 50 may be operative during the frames Ft, and need not be operative during the frames Fd, depending on the detection control signal TSC.

Figure 7:
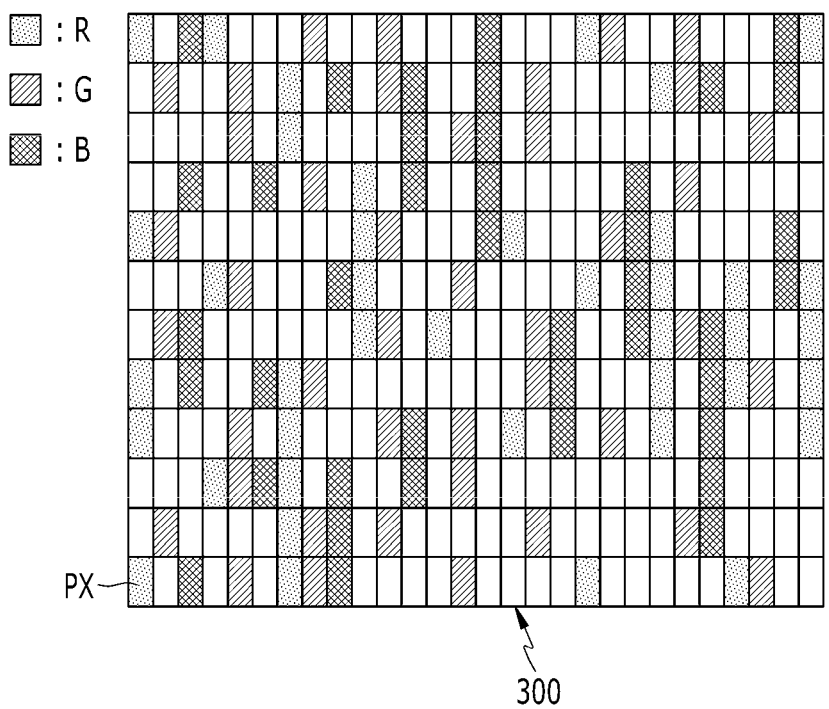
FIGS. 7 and 8 illustrate images of patterns on the display panel of FIG. 1 (as captured by the position detecting sensor).
Figure 8:
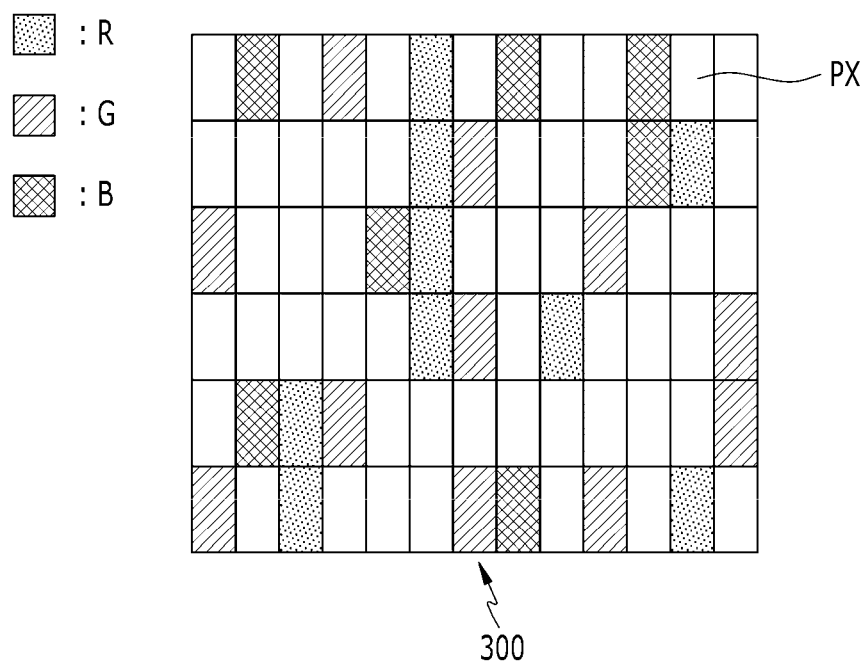

Next, the position detecting system of FIG. 1 will be described with reference to FIGS. 6 to 8. Specifically, FIG. 6 depicts a cross-sectional side view of the position detecting sensor 50, and FIGS. 7 and 8 illustrate images of patterns on the display panel 300 (as captured by the position detecting system).

Figure 6:
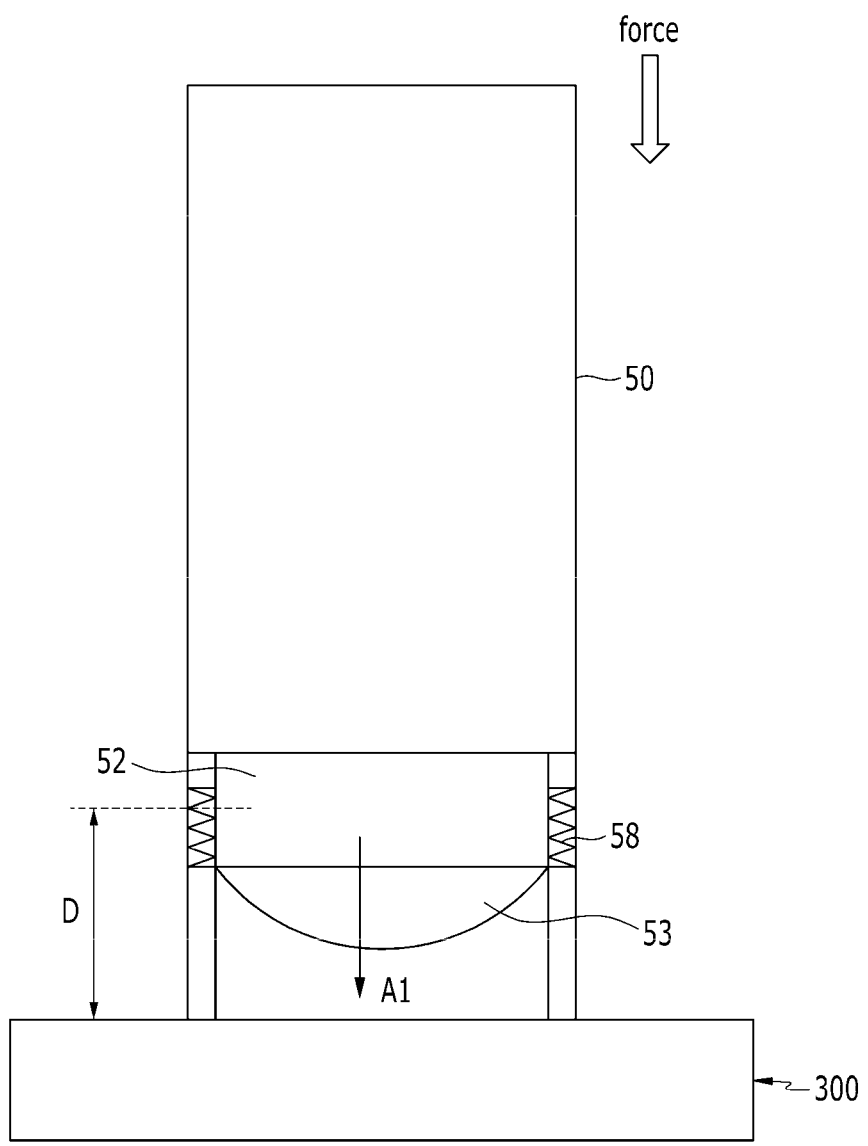
FIG. 6 is a cross-sectional side view of the position detecting sensor of FIG. 1.

Referring to FIG. 6, the position detecting sensor 50 is disposed on the display panel 300. The position detecting sensor 50 includes an elastic body 58, a camera 52, and an optical lens 53. The elastic body 58 changes a distance D between the camera 52 and the display panel 300 depending on the contact pressure applied to the position detecting sensor 50. The camera 52 is disposed at an end of the position detecting sensor 50. When the distance D is reduced, the camera 52 may slide in a downward direction A1. Accordingly, as the contact pressure increases, the camera 52 descends in the downward direction A1 approaching the display panel 300, and as the contact pressure reduces, the camera 52 moves away from the display panel 300 in a direction opposite to A1.

The camera 52 is configured to capture an image of the patterns (in a frame Ft) on the display panel 300. When the camera 52 is disposed relatively distant away from the display panel 300 (i.e. the distance D is large), the captured image of the patterns may include a high density of pixels PXs displayed at a reduced size, as illustrated in FIG. 7. Conversely, when the camera 52 is disposed relatively close to the display panel 300 (i.e. the distance D is small), the captured image of the patterns may include a low density of pixels PXs displayed at an increased size, as illustrated in FIG. 8. An expansion/reduction ratio can be determined based on the density and/or size of the pixels PX in the captured image of the patterns. Subsequently, information relating to contact pressure may be obtained based on the expansion/reduction ratio.

As mentioned above, the position detecting sensor 50 also includes the optical lens 53. The optical lens 53 may be disposed in front of the position detecting sensor 50. As shown in FIG. 6, the optical lens 50 is disposed in front of the camera 52 (in the direction A1). The optical lens 53 may also include an optical filter (not illustrated) that allows light within a specific wavelength band to pass through the optical lens 53. The optical lens 53 may further include one or more concave lens or convex lens for focusing incident light to the camera 52.

Next, a backlight unit of the display unit according to another embodiment of the inventive concept will be described with reference to FIG. 9.

Figure 9:
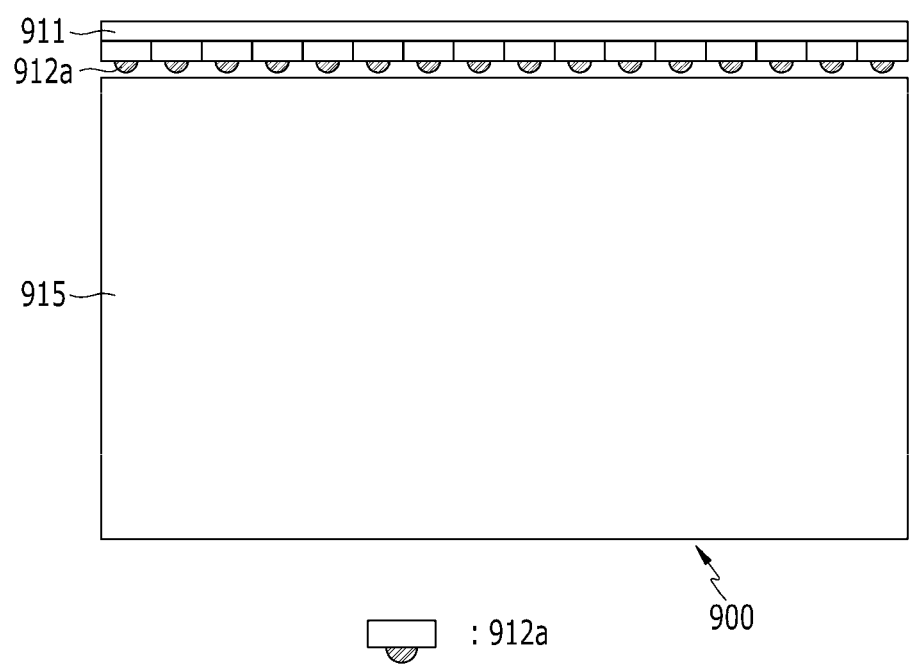
FIG. 9 is a top plan view of a backlight unit according to another embodiment.

FIG. 9 is a top plan view of a backlight unit 900 according to another embodiment.

The backlight unit 900 of FIG. 9 is similar to the backlight unit 900 of FIG. 4, and thus a detailed description of the similar elements shall be omitted. Comparing FIGS. 4 and 9, it is noted that the infrared light emitting unit 912b (in FIG. 4) has been omitted from the backlight unit 900 in FIG. 9. As shown in FIG. 9, the backlight unit 900 includes the visible light emitting unit 912a disposed on the printed circuit board (PCB) 911. Accordingly, the backlight unit 900 in FIG. 9 is configured to selectively emit visible light (in a specific wavelength band) via the visible light emitting unit 912a.

Next, a method of driving a position detecting system including the backlight unit of FIG. 9 will be described with reference to FIGS. 10 and 11.

Figure 10:
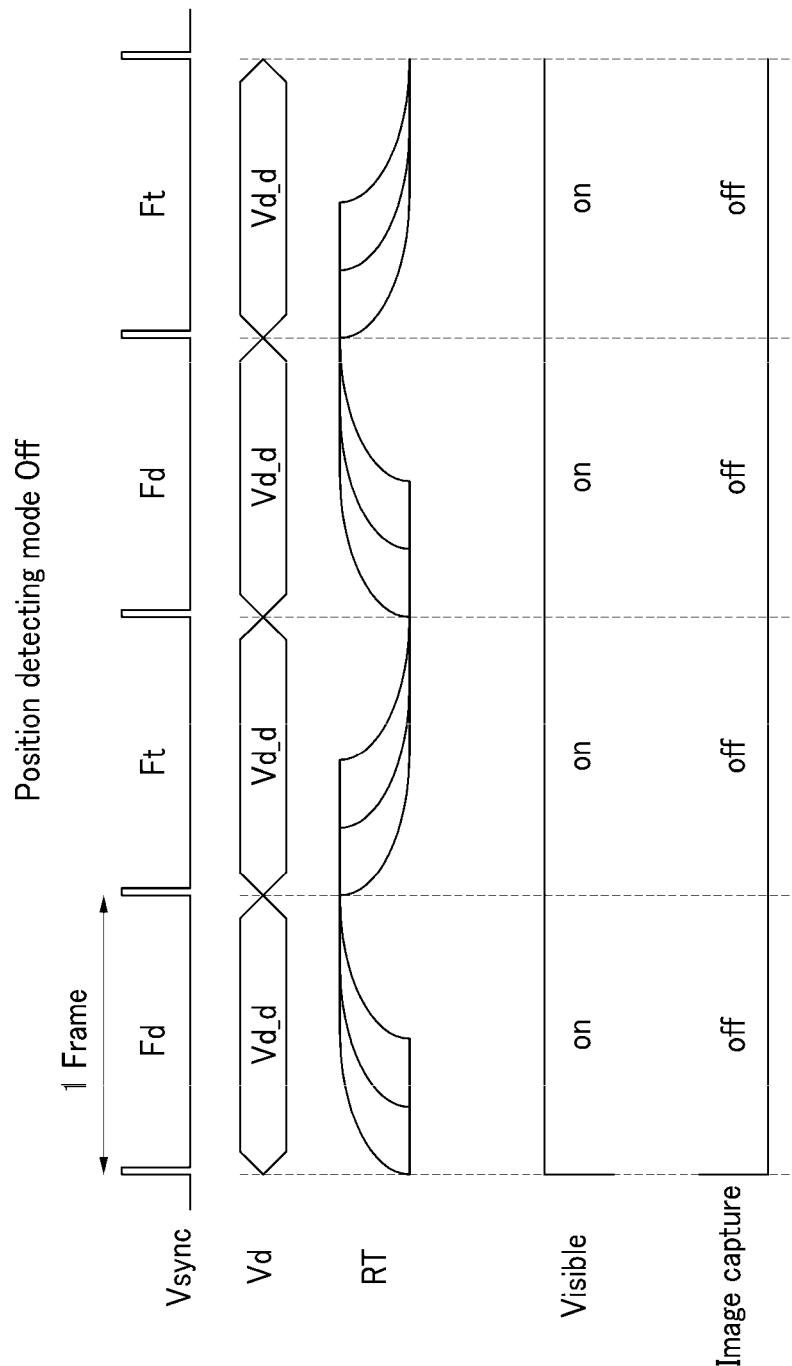
FIGS. 10 and 11 are timing diagrams of the driving signals in the position detecting system using the backlight unit of FIG. 9.
Figure 11:
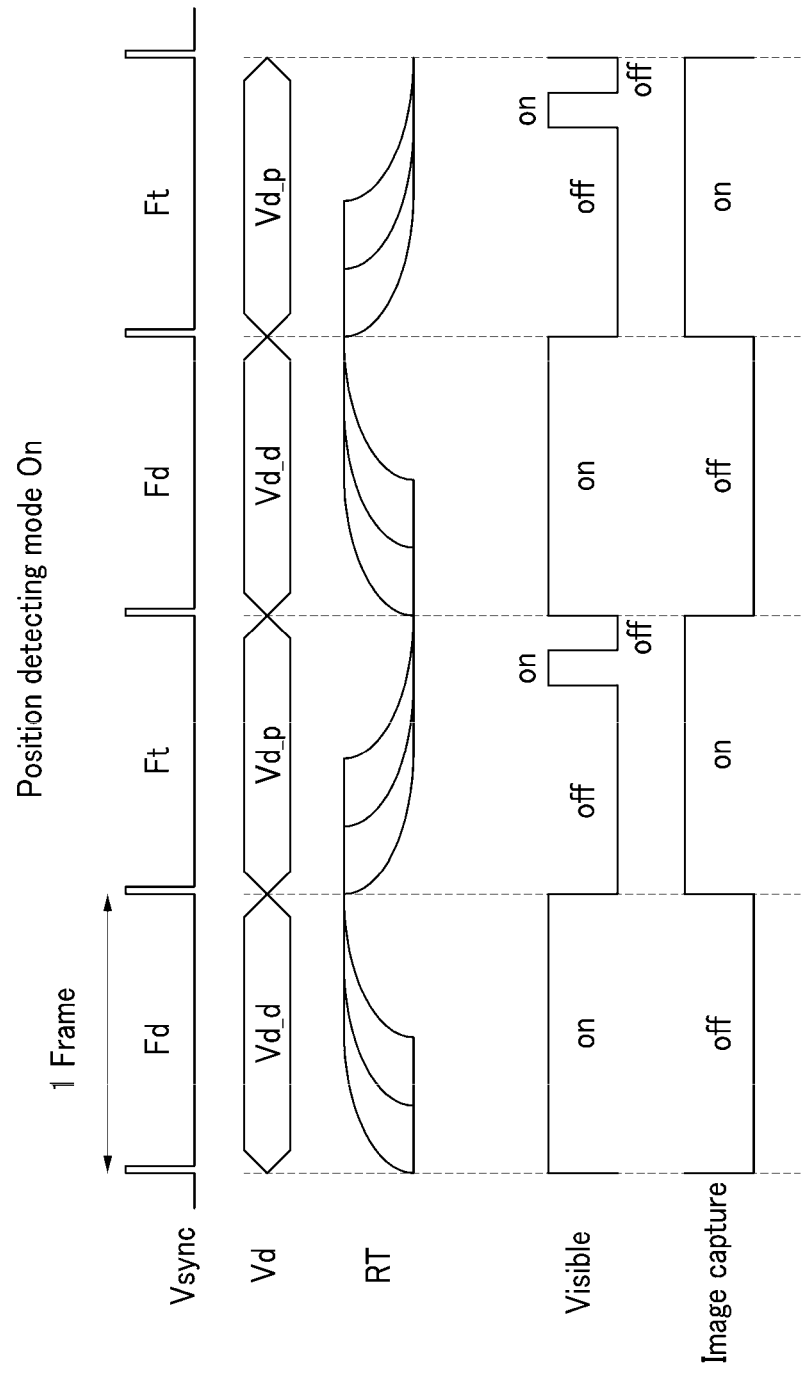

FIGS. 10 and 11 are different timing diagrams of the driving signals in the position detecting system using the backlight unit of FIG. 9. Specifically, FIG. 10 illustrates the timing diagram for when a position detecting mode is turned off, and FIG. 11 illustrates the timing diagram for when a position detecting mode is turned on.

Referring to FIGS. 10 and 11, each frame starts in synchronization with the vertical synchronization signal Vsync. The frame includes a frame Fd for displaying an image and a frame Ft for displaying patterns. According to an exemplary embodiment, the frames Fd and Ft may be alternately disposed, as illustrated in FIGS. 10 and 11.

Referring back to FIG. 5, a first data voltage Vd_d (for displaying an image) is input to the display panel 300 for the frame Fd. A second data voltage Vd_p (for displaying patterns) is input to the display panel 300 for the frame Ft.

As previously mentioned, when a pixel PX receives a voltage (either the first data voltage Vd_d or the second data voltage Vd_p) for each frame, the optical conversion element of the pixel PX (for example, liquid crystal molecules) responds to the data voltage. A response degree RT of the optical conversion element is rapidly changed at the early stage of each frame, and thus the optical conversion element may reach a target state after some time has lapsed.

According to the embodiment of FIGS. 10 and 11, the signal control unit 600 may transmit an on/off signal of a position detecting mode to the backlight unit 900. The backlight unit 900 may be driven differently depending on whether the position detecting mode is turned on or turned off. For example, the position detecting mode may be turned on when the position detecting sensor 50 approaches the display panel 300, and the position detecting mode may be turned off when the position detecting sensor 50 moves away from the display panel 300.

When a display unit includes the backlight unit 900 (of FIG. 9) and the position detecting mode is turned off, the visible light emitting unit 912a of the backlight unit 900 may be turned on during the frames Fd and Ft, as illustrated in FIG. 10. Accordingly, the first data voltage Vd_d is also input to the frames Ft, so as to continuously display a image on the display panel 300 (across all frames Fd and Ft).

The first data voltage Vd_d may correspond to the input image signal IDAT of a previous frame. In some embodiments, the first data voltage Vd_d may correspond to a data voltage that is different from the input image signal IDAT of the previous frame.

It should be noted that the position detecting sensor 50 is not in operation when the position detecting mode is turned off. Accordingly, the image capture function of the position detecting sensor 50 will be turned off, as illustrated in FIG. 10.

Referring to FIG. 11, when the position detecting mode is turned on, the visible light emitting unit 912a may be turned on during the frames Fd. However, the visible light emitting unit 912a may only be turned on during a portion of each frame Ft. Accordingly, in the embodiment of FIG. 11, each frame Ft may display an image of the patterns for a period of time (corresponding to the length of time that the visible light emitting unit 912a is turned on during each frame Ft). The time period during which the visible light emitting unit 912a is turned on for each frame Ft may be adjusted (e.g. shortened) accordingly to prevent an observer from observing the image patterns. The period of time (during which the visible light emitting unit 912a is turned on for each frame Ft) may be determined based on the detection control signal TSC, or the separate synchronization signal between the position detecting sensor 50 and the backlight unit 900.

When the position detecting mode is turned on, the position detecting sensor 50 is operative during the frames Ft. Accordingly, when the position detecting mode is turned on, the position detecting sensor 50 is operative during the frames Ft, and need not be operative during the frames Fd. The position detecting sensor 50 captures a portion of an image of the patterns, and generates the touch information TS based on the captured image patterns. In the embodiment of FIGS. 10 and 11, the image of the patterns may include an image(s) rendered using visible light. The touch information TS may include information relating to the coordinates of the contact position or contact pressure.

In the above-described embodiment, the patterns are selectively displayed when the position detecting mode is turned on. Since the patterns for detecting contact positions are displayed exclusively in a frame (for those patterns) and need not be combined with other image frames, the image quality (as observed by an observer) can therefore be improved.

Next, a position detecting system according to another embodiment will be described with reference to FIG. 12. Specifically, FIG. 12 illustrates a cross-sectional view of another exemplary position detecting sensor 50.

Figure 12:
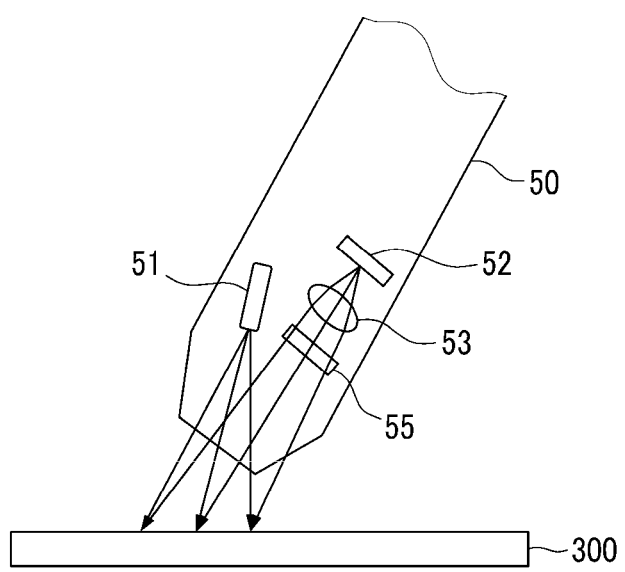
FIG. 12 is a cross-sectional side view of another exemplary position detecting sensor.

The position detecting sensor 50 in FIG. 12 includes elements similar to those depicted in FIG. 6, and thus a detailed description of the similar elements shall be omitted As shown in FIG. 12, the position detecting sensor 50 includes the camera 52 and optical lens 53 of FIG. 6. The position detecting sensor 50 further includes a light source 51 and an optical filter 55. The position detecting sensor 50 is capable of capturing image patterns based on light reflected from the display panel 300, as described in more detail below.

The light source 51 generates light (e.g. infrared light, visible light, or ultraviolet light) and emits the light to the display panel 300. The light may be emitted through a hole disposed at an end of the position detecting sensor 50.

The light is then reflected from the surface of the display panel 300, with a portion of the reflected light passing through the optical filter 55. The optical filter 55 filters the reflected light, by allowing light of a specific wavelength band to pass through to the optical lens 53. The light within the specific wavelength band may include a wavelength band of light emitted from the light source 51, or a wavelength band of light that can be detected by the camera 52.

The optical lens 53 may include one or more concave lens or convex lens for focusing the filtered light to the camera 52.

The camera 52 may capture an image of the patterns on the display panel 300 based on the reflected light. As mentioned previously, contact information may be obtained from the captured image of the patterns.

Next, an exemplary method of driving the position detecting system of FIG. 12 using the backlight unit of FIG. 9 will be described with reference to FIG. 13.

Figure 13:
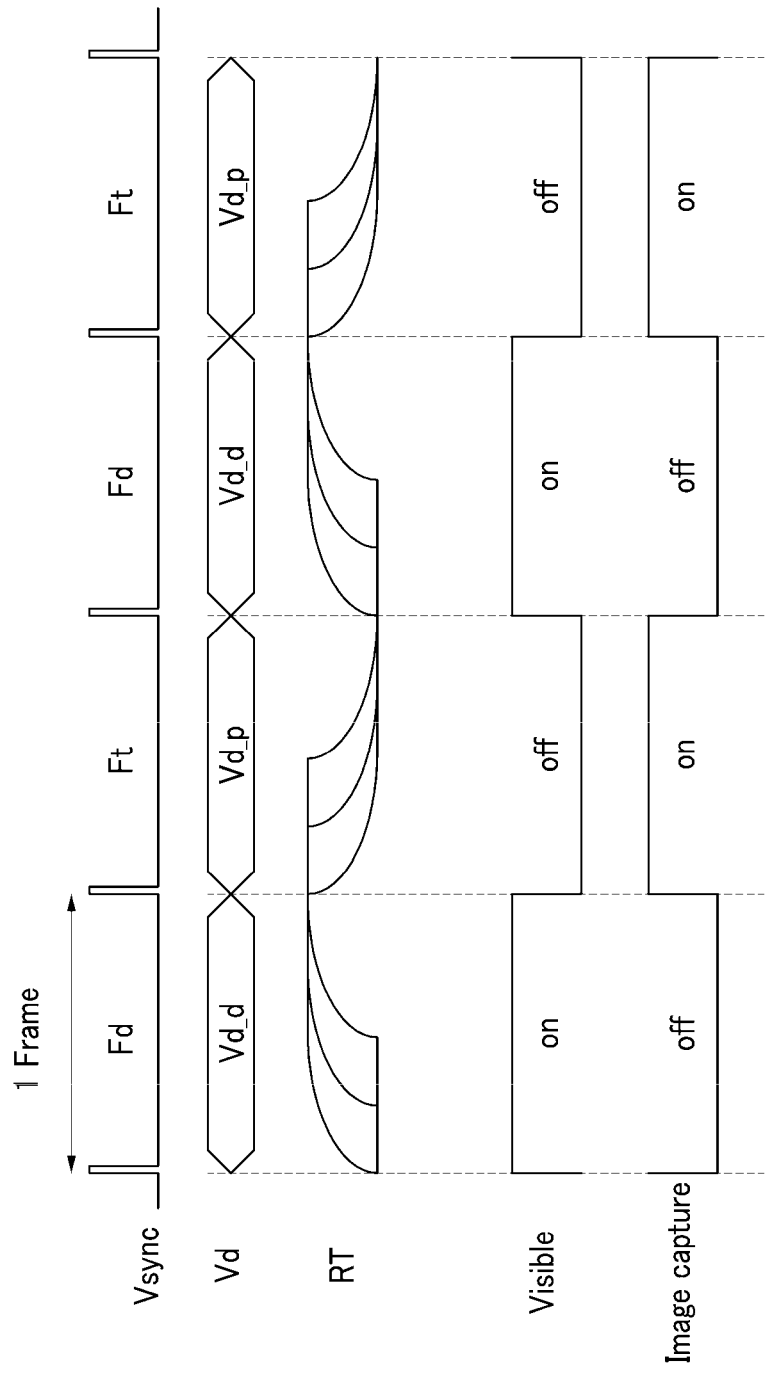
FIG. 13 is a timing diagram of the driving signals in the position detecting system of FIG. 12 according to an embodiment.

FIG. 13 is a timing diagram of the driving signals in the position detecting system of FIG. 12 according to an embodiment.

Referring to FIG. 13, each frame starts in synchronization with a vertical synchronization signal Vsync. The frame includes a frame Fd for displaying an image and a frame Ft for displaying patterns. According to an exemplary embodiment, the frames Fd and Ft may be alternately disposed, as illustrated in FIG. 13.

A first data voltage Vd_d (for displaying an image) is input to the display panel 300 during the frames Fd. A second data voltage Vd_p (for displaying patterns) is input to the display panel 300 during the frames Ft.

Referring back to FIGS. 10 and 11, the signal control unit 600 may transmit an on/off signal of a position detecting mode to the backlight unit 900. As mentioned previously, the backlight unit 900 may be driven differently depending on whether the position detecting mode is turned on or turned off. For example, the position detecting mode may be turned on when the position detecting sensor 50 approaches the display panel 300, and the position detecting mode may be turned off when the position detecting sensor 50 moves away from the display panel 300.

Referring to FIG. 13, when the position detecting mode is turned on, the visible light emitting unit 912a may be turned on during the frames Fd and turned off during the frames Ft. The second data voltage Vd_p is transferred to the frames Ft so as to display an image for the patterns.

When the position detecting mode is turned on, the position detecting sensor 50 is operative during the frames Ft and captures a portion of the image of the patterns. Accordingly, when the position detecting mode is turned on, the position detecting sensor 50 is operative during the frames Ft and need not be operative during the frames Fd. As mentioned previously with reference to FIG. 12, light is emitted from the light source 51 to a region of the display panel 300 and reflected from the display panel 300. The camera 52 then captures the reflected light after it has been focused and filtered. Accordingly, the position detecting sensor 50 operates the light source 51 and the camera 52 during the frames Ft so as to capture a portion of the image of the patterns.

Thus, in the embodiment of FIG. 13, the images for the frames Fd and the patterns for the frames Ft will not overlap on the display panel 300, thereby resulting in greater image clarity to an observer.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the present disclosure.

What is claimed is:

1. A position detecting system, comprising:
a display panel including a plurality of pixels;
a backlight unit including a first light emitting unit and a second light emitting unit;
a data driving unit configured to apply a first data voltage and a second data voltage to the plurality of pixels of the display panel, wherein the display panel is configured to display an image based on the first data voltage during a first frame and the display panel is further configured to display patterns based on the second data voltage during a second frame; and
a position detecting sensor configured to capture an image of the patterns displayed by the display panel during the second frame,
wherein the first light emitting unit is turned on and the second light emitting unit is turned off during the first frame, and the image is displayed on the display panel during the first frame using the first light emitting unit,
wherein the second light emitting unit is configured to supply either visible light or invisible light to the display panel, and
wherein the first light emitting unit is turned off and the second light emitting unit is turned on during the second frame, and the patterns are displayed on the display panel during the second frame by changing grays of the plurality of pixels using only the visible light or the invisible light of the second light emitting unit.

2. The position detecting system of claim 1,
wherein the first light emitting unit is a visible light emitting unit configured to supply visible light to the display panel.

3. The position detecting system of claim 2, wherein:
when the position detecting mode is turned off:
the data driving unit is configured to apply the first data voltage to the display panel, and the visible light emitting unit is configured to supply the visible light to the display panel.

4. The position detecting system of claim 2, wherein:
the visible light emitting unit is configured to supply the visible light to the display panel during a portion of the second frame when the second data voltage is being applied to the display panel during the second frame.

5. The position detecting system of claim 4, wherein:
the visible light emitting unit is configured to supply the visible light to the display panel during the first frame when the first data voltage is being applied to the display panel during the first frame.

6. The position detecting system of claim 5, wherein:
the position detecting sensor includes a camera configured to capture a portion of the image of the patterns, wherein a position of the camera within the position detecting sensor changes depending on a contact pressure applied to the position detecting sensor.

7. The position detecting system of claim 3, wherein:
the position detecting sensor includes a light source configured to emit the visible light towards the display panel, and a camera configured to capture a portion of the visible light reflected from the display panel, wherein the portion of the reflected light is used to form the image of the patterns.

8. The position detecting system of claim 7, wherein:
the visible light emitting unit is turned off during the second frame when the second data voltage is applied to the display panel during the second frame, and
the visible light emitting unit is turned on during the first frame when the first data voltage is applied to the display panel during the first frame.

9. The position detecting system of claim 8, wherein:
the camera is configured to capture a portion of the image of the patterns, wherein a position of the camera within the position detecting sensor changes depending on a contact pressure applied to the position detecting sensor.

10. The position detecting system of claim 2, wherein:
the second light emitting unit is an infrared light emitting unit configured to supply infrared light to the display panel.

11. The position detecting system of claim 10, wherein:
the infrared light emitting unit is configured to emit the infrared light when the second data voltage is applied to the display panel during the second frame, and
the visible light emitting unit is configured to emit the visible light when the first data voltage is applied to the display panel during the first frame.

12. The position detecting system of claim 11, wherein:
the position detecting sensor includes a camera configured to capture a portion of the image of the patterns, wherein a position of the camera within the position detecting sensor changes depending on a contact pressure applied to the position detecting sensor.

13. The position detecting system of claim 1, wherein:
the position detecting sensor includes a camera configured to capture a portion of the image of the patterns, wherein a position of the camera within the position detecting sensor changes depending on a contact pressure applied to the position detecting sensor.

14. A method of driving a position detecting system, comprising:
providing a backlight unit including a first light emitting unit and a second light emitting unit;
applying a first data voltage and a second data voltage to a display panel;
turning on the first light emitting unit and turning off the second light emitting unit during a first frame;
displaying an image on the display panel based on the first data voltage during the first frame using the first light emitting unit;
turning off the first light emitting unit and turning on the second light emitting unit during a second frame;
displaying patterns on the display panel based on the second data voltage during the second frame by changing grays of the plurality of pixels using only visible or invisible light of the second light emitting unit, wherein the second light emitting unit is configured to supply either the visible or invisible light to the display panel; and
capturing an image of the patterns displayed during the second frame using a position detecting sensor.

15. The method of claim 14, further comprising:
when the position detecting mode is turned off:
applying the first data voltage to the display panel, and supplying visible light to the display panel using the first light emitting unit.

16. The method of claim 14, further comprising:
supplying visible light to the display panel using the first light emitting unit during a portion of the second frame when the second data voltage is being applied to the display panel during the second frame.

17. The method of claim 14, wherein capturing the image of the patterns using the position detecting sensor further comprises:
emitting light towards the display panel, and
capturing a portion of the light reflected from the display panel, wherein the portion of the reflected light is used to form the image of the patterns.

18. The method of claim 14, further comprising:
supplying infrared light to the display panel using the second light emitting unit when the second data voltage is applied to the display panel; and
supplying visible light to the display panel using the first light emitting unit when the first data voltage is applied to the display panel.

19. The method of claim 14, further comprising:
changing a position of a camera disposed within the position detecting sensor based on a contact pressure applied to the position detecting sensor.

20. The method of claim 14, further comprising:
generating touch information by processing the image of the patterns captured by the position detecting sensor.

* * * * *